Figure 2:
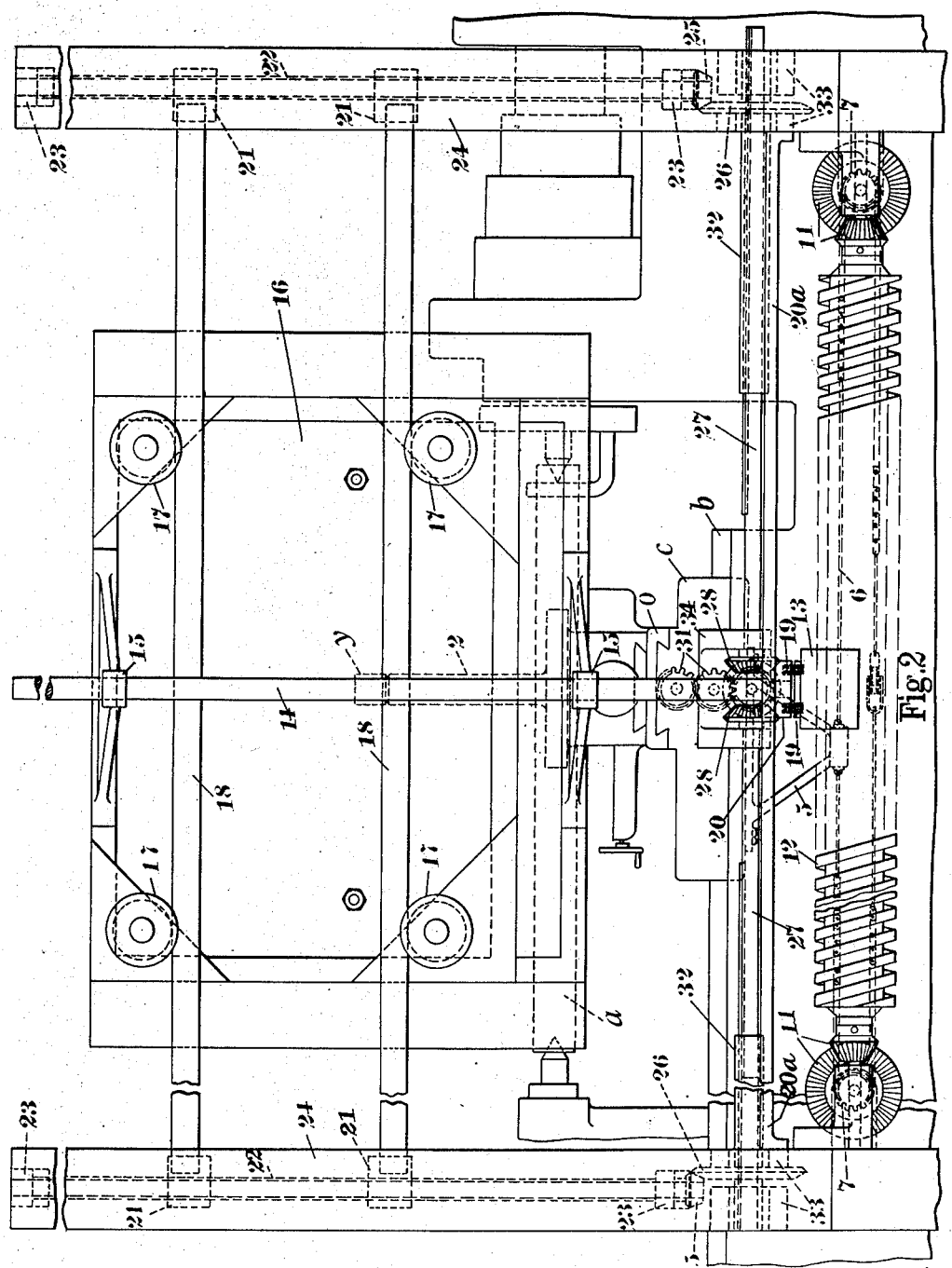

Sept. 20, 1938.  J. W. ALEXANDER  2,130,710
MANUFACTURE OF METAL CUTTING TOOLS
Filed Jan. 12, 1938  2 Sheets-Sheet 1
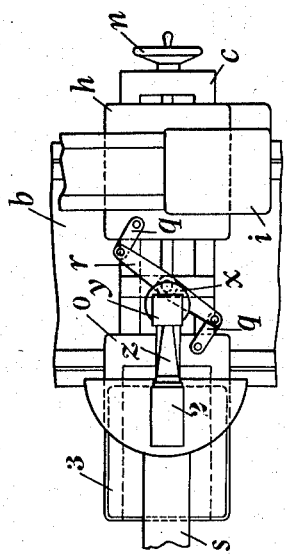
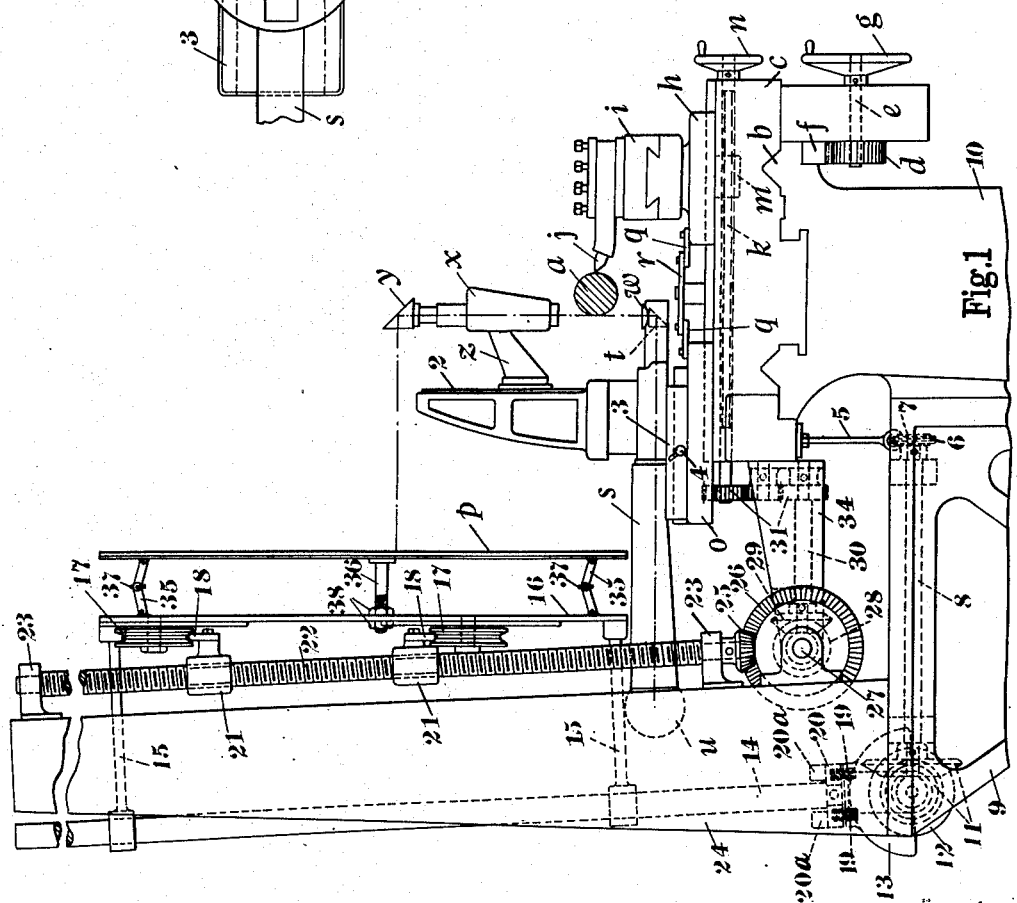
J. W. Alexander
Inventor
By: Glascock Downing Seebold
Attys.

Sept. 20, 1938.  J. W. ALEXANDER  2,130,710
MANUFACTURE OF METAL CUTTING TOOLS
Filed Jan. 12, 1938  2 Sheets-Sheet 2

J. W. Alexander
Inventor
By: Glascock Downing Seebold
Attys.

Patented Sept. 20, 1938

2,130,710

UNITED STATES PATENT OFFICE 2,130,710

MANUFACTURE OF METAL CUTTING TOOLS

James Wolfe Alexander, Birmingham, England

Application January 12, 1938, Serial No. 184,695
In Great Britain January 15, 1937

8 Claims.  (Cl. 82—14)

This invention has for its object to provide improved means for facilitating the manufacture of metal cutting tools of the kind known as "form" tools, that is to say rotary tools having a configuration of complex shape.

The invention comprises, for use with a lathe in which the work piece can be rotated, the combination of a slide adapted to carry the cutting tool and movable in longitudinal and transverse directions relatively to the work piece, optical means for projecting a silhouette or image of a portion of the profile of the work piece on to a screen carrying an enlarged drawing of the desired profile, and means for causing the position on the screen of the projected silhouette or image to vary in a manner correlated with the movements of the cutting tool.

In the two accompanying sheets of explanatory drawings:—

Figures 1 to 3 are respectively a side elevation, a rear elevation, and a fragmentary plan of means constructed in accordance with the invention and applied to a lathe.

In carrying the invention into effect as shown, I employ any suitable lathe in which the "form" tool $a$ (hereinafter termed the work piece) to be shaped can be rotated. On the bed $b$ of the lathe there is provided a longitudinally slidable saddle $c$ which is adapted to be actuated by the interaction of a pinion $d$ on a rotary spindle $e$ and a fixed rack $f$ on the bed $b$ of the lathe, the spindle $e$ being carried by the saddle $c$ and being provided with an operating hand wheel $g$. On the saddle $c$ is mounted a transversely movable slide $h$ which carries a holder $i$ for the cutting tool $j$, and which is adapted to be actuated by a screw-threaded spindle $k$ engaging a nut $m$ on the underside of the slide $h$, the spindle $k$ being rotatably supported by the saddle $c$ and being provided at its front end with an operating hand wheel $n$. By the arrangement above described the cutting tool $j$ can be moved parallel with and at right angles to the axis of rotation of the work piece $a$. On the saddle $c$ I provide another transversely movable slide $o$ on which is mounted an optical projection apparatus for projecting on to a vertical screen $p$, mounted immediately behind the lathe, a silhouette or image of a part of the periphery of the work piece $a$.

The slide $o$ is arranged in alignment with the slide $h$ and is connected to the latter by links $q$ and a lever $r$ so that movement of the slide $h$ in either direction is accompanied by corresponding movement of the slide $o$ in the opposite direction, the links $q$ being respectively connected to these slides and being interconnected by the lever $r$ which is pivoted at its centre to the saddle $c$.

The optical projection apparatus above mentioned is of any known and convenient form, and comprises a horizontal projector $s$ arranged at right angles to and at a lower level than the work piece $a$. The front end of this projector is situated beneath the rear portion of the work piece and contains a light-deflecting prism $t$. At its other end the projector $s$ terminates in a housing $u$ which contains a light source in the form of an incandescent bulb (not shown), and from which a beam of light can be directed through the interior of the projector. This beam of light is directed upwardly by the prism $t$ through a lens $w$ in the wall of the projector $s$ above the prism, and passes thence through a vertical projector $x$ which is situated above the rear portion of the work piece $a$, and which carries at its upper end another light-deflecting prism $y$ whereby the beam of light is directed horizontally and rearwardly on to the screen $p$, the latter being arranged in a vertical plane parallel with the axis of the work piece $a$. The vertical projector $x$ is carried by a bracket $z$ on a vertical support 2 which is mounted on the horizontal projector $s$, and the latter is carried on the slide $o$ by a slidably adjustable base piece 3 which is adapted to be secured in its adjusted position on the slide by a thumb screw 4.

For enabling the screen $p$ to be moved horizontally with, but at a higher speed than, the saddle $c$, a bracket 5 mounted on the underside of the rear portion of the saddle is connected at its lower end to one side of an endless chain 6 which is carried by and is adapted to actuate sprocket wheels 7. These sprocket wheels are respectively secured to corresponding ends of a pair of horizontal rotary spindles 8 which are arranged one at each end of the lathe and are carried by brackets 9 secured to the rear of the lathe supporting structure 10. The other ends of the spindles 8 are connected by bevel gearing 11 to opposite ends of a horizontal screw 12 the upper side of which is engaged by a half-nut 13 at the lower end of a rod 14. This rod 14 is slightly inclined to the vertical for the purpose hereinafter described, and is connected to the screen $p$ by brackets 15 which are slidable on the rod 14 and are secured to the rear of a supporting plate 16 carrying the screen $p$. The supporting plate 16 is carried by rollers 17 engaging horizontal guides 18. By the arrangement above described movement of the saddle $c$ causes rotation of the screw 12 which imparts horizontal sliding movement at the desired speed to the screen p through the half-nut 13, rod 14, brackets 15 and supporting plate 16, the said speed being determined by the gear-ratio of the bevel wheels 11. In the example shown the half-nut 13 is made separately from the rod 14 and is held in engagement with the screw 12 by springs 19 situated partly within recesses formed in the upper side of the half-nut and partly within recesses formed in the adjacent face of a collar 20 secured to the lower end of the rod 14, upward movement of the rod 14 under the action of the springs 19 being prevented by horizontal guide bars 20a which are secured at opposite ends to the supports 24 and against which the upper surface of the collar 20 abuts.

For enabling the screen p to receive vertical movements correlated to the horizontal movements of the slide o, the guides 18 are carried by nuts 21 on a pair of rotary screw threaded spindles 22 which are inclined to the vertical in a similar manner to the rod 14, and which are journalled one behind each end of the lathe in brackets 23 on vertical supports 24 mounted on the brackets 9 above mentioned. The screw threads on the spindles 22 are oppositely directed, and the lower ends of these spindles are respectively connected by interengaging bevel wheels 25, 26 of suitable ratio to a pair of coaxially arranged horizontal rotary spindles 27, the adjacent ends of the latter spindles being each connected by a bevel wheel 28 to a bevel wheel 29 secured on the adjacent end of another horizontal rotary spindle 30, the latter spindle being arranged at right angles to the spindles 27. At its end remote from the bevel wheel 29 the spindle 30 is connected by gearing 31 to the adjacent end of the operating spindle k of the slides h, o. The bevel wheels 26 are formed on sleeves 32 which are keyed or splined to the spindles 27 so as to permit sliding movement of the latter relatively to the bevel wheels 26, the sleeves 32 being journaled in bearings 33 on the supports 24 and being incapable of endwise movement. At their adjacent ends the spindles 27 are journalled in a bracket 34 which also carries the spindle 30, and which is secured to the saddle c. By the arrangement above described rotary motion of the slide-operating spindle k causes vertical movements to be imparted to the screen p, these movements being suitably correlated to the movements imparted by the spindle k to the slides h, o.

The inclination of the spindles 22 and rod 14, and also the gear ratio of the mechanism by which the screws 22 are actuated from the hand wheel n are made such that the horizontal distance between the screen p and the prism y of the optical projection apparatus remains constant irrespective of the movements imparted to this apparatus by the slide o.

In the example shown the screen p is adjustably secured to the supporting plate 16 by pairs of links 35 and screws 36. The links 35 in each pair are respectively connected to the adjacent surfaces of the screen p and supporting plate 16, and are interconnected by a thumb screw 37, whilst the screws 36 are secured to the rear of the screen and are adjustably connected to the supporting plate by nuts 38.

For enabling the operation of the mechanism above described to be understood, a simple example will now be described. Let it be supposed that the operator desires to produce a "form" tool of elliptical form. There is drawn on the screen p a semi-elliptical line showing accurately to a large scale the configuration required to be produced on the work piece a. In this simple example, the operator would start with a work piece or blank of cylindrical form. After mounting the work piece in the lathe, the optical projection apparatus would be adjusted to throw on the screen a silhouette or image of the part of the work piece in the zone immediately adjacent to the cutting tool j. The portions of the work piece a to be cut away would then be removed by moving the cutting tool j in directions at right angles to and parallel with the axis of rotation of the work piece, and with the cutting away of the work piece by the tool so would the shape of the projected silhouette or image be varied. The aim of the operator is progressively to cut away the work piece until the projected silhouette or image coincides exactly with the corresponding part of the pattern on the screen.

By this invention the production of form tools of complex form is greatly facilitated, as some of the tedious manipulations at present necessary are eliminated, and the operator is able accurately to bring the work piece to the desired shape without removing it from the lathe for measurement or for checking it with a pattern.

Having thus described my invention what I claim as new and desire to secure by Letters Patent is:—

1. Means for facilitating the manufacture of cutting tools of the kind specified by lathes in which the work piece can be rotated, comprising the combination of a slide adapted to carry the cutting tool and movable in longitudinal and transverse directions relatively to the work piece, a screen for carrying an enlarged drawing of the profile to be given to the work piece, optical means for projecting on to the screen a silhouette or image of a portion of the profile of the work piece, and means for moving the screen and optical means in a manner correlated with both the longitudinal and transverse movements of the cutting tool.

2. Means as and for the purpose claimed in claim 1, comprising the combination with the slide, of another slide carrying the optical means and connected to the first mentioned slide so that movement of the latter slide in either direction is accompanied by equal movement of the second mentioned slide in the opposite direction, a slidable saddle on which the slides are transversely movable relatively to the work piece, a fixed support on which the saddle is longitudinally movable relatively to the work piece, means for moving the first mentioned slide and thereby imparting movement in the opposite direction to the second mentioned slide, and means for actuating the saddle.

3. Means as and for the purpose claimed in claim 1, comprising the combination with the slide, of another slide carrying the optical means and connected to the first mentioned slide so that movement of the latter slide in either direction is accompanied by equal movement of the second mentioned slide in the opposite direction, a slidable saddle on which the slides are transversely movable relatively to the work piece, a fixed support on which the saddle is longitudinally movable relatively to the work piece, means for moving the first mentioned slide and thereby imparting movement in the opposite direction to the second mentioned slide, means for actuating the saddle, the screen being adapted to receive horizontal and vertical movements correlated respectively with the movements of the saddle and the movements of the tool slide.

4. Means as and for the purpose claimed in claim 1, comprising the combination with the slide, of another slide carrying the optical means and connected to the first mentioned slide so that movement of the latter slide in either direction is accompanied by equal movement of the second mentioned slide in the opposite direction, a slidable saddle on which the slides are transversely movable relatively to the work piece, a fixed support on which the saddle is longitudinally movable relatively to the work piece, means for moving the first mentioned slide and thereby imparting movement in the opposite direction to the second mentioned slide, means for actuating the saddle, and horizontal guides on which the screen is supported in a vertical position, and along which the screen can be moved in a manner correlated with the movements of the saddle, the said guides being adapted to receive vertical movements correlated with the movements of the tool slide.

5. Means as and for the purpose claimed in claim 1, comprising the combination with the slide, of another slide carrying the optical means and connected to the first mentioned slide so that movement of the latter slide in either direction is accompanied by equal movement of the second mentioned slide in the opposite direction, a slidable saddle on which the slides are transversely movable relatively to the work piece, a fixed support on which the saddle is longitudinally movable relatively to the work piece, means for moving the first mentioned slide and thereby imparting movement in the opposite direction to the second mentioned slide, means for actuating the saddle, horizontal guides on which the screen is supported in a vertical position, and along which the screen can be moved in a manner correlated with the movements of the saddle, rotary screw threaded spindles carrying the said guides and adapted to impart thereto vertical movements correlated with the movements of the tool slide, another rotary spindle for actuating the slides, and gearing interconnecting the latter spindle and the said screw threaded spindles.

6. Means as and for the purpose claimed in claim 1, comprising the combination with the slide, of another slide carrying the optical means and connected to the first mentioned slide so that movement of the latter slide in either direction is accompanied by equal movement of the second mentioned slide in the opposite direction, a slidable saddle on which the slides are transversely movable relatively to the work piece, a fixed support on which the saddle is longitudinally movable relatively to the work piece, means for moving the first mentioned slide and thereby imparting movement in the opposite direction to the second mentioned slide, means for actuating the saddle, horizontal guides on which the screen is supported in a vertical position, and along which the screen can be moved horizontally, the said guides being adapted to receive vertical movements correlated with the movements of the tool slide, a member for imparting to the screen horizontal sliding movements correlated with the movements of the saddle, the screen being vertically slidable relatively to the said member, and means for operatively connecting the said member to the saddle, the said means comprising gearing arranged between screw-and-nut mechanism for actuating the said member and chain-and-sprocket mechanism responsive to the action of the saddle.

7. Means as and for the purpose claimed in claim 1, comprising the combination with the slide, of another slide carrying the optical means and connected to the first mentioned slide so that movement of the latter slide in either direction is accompanied by equal movement of the second mentioned slide in the opposite direction, a slidable saddle on which the slides are transversely movable relatively to the work piece, a fixed support on which the saddle is longitudinally movable relatively to the work piece, means for moving the first mentioned slide and thereby imparting movement in the opposite direction to the second mentioned slide, means for actuating the saddle, horizontal guides on which the screen is supported in a vertical position, and along which the screen can be moved horizontally, rotary screw threaded spindles carrying the said guides and adapted to impart thereto vertical movements correlated with the movements of the tool slide, another rotary spindle for actuating the slides, gearing interconnecting the latter spindle and the said screw threaded spindles, a member for imparting to the screen horizontal sliding movements correlated with the movements of the saddle, the screen being vertically slidable relatively to the said member, and means for operatively connecting the said member to the saddle, the said means comprising gearing arranged between screw-and-nut mechanism for actuating the said member and chain-and-sprocket mechanism responsive to the action of the saddle.

8. Means as and for the purpose claimed in claim 1, comprising the combination with the slide, of another slide carrying the optical means and connected to the first mentioned slide so that movement of the latter slide in either direction is accompanied by equal movement of the second mentioned slide in the opposite direction, a slidable saddle on which the slides are transversely movable relatively to the work piece, a fixed support on which the saddle is longitudinally movable relatively to the work piece, means for moving the first mentioned slide and thereby imparting movement in the opposite direction to the second mentioned slide, means for actuating the saddle, horizontal guides on which the screen is supported in a vertical position, and along which the screen can be moved in a manner correlated with the movements of the saddle, rotary screw threaded spindles carrying the said guides and adapted to impart thereto vertical movements correlated with the movements of the tool slide, another rotary spindle for actuating the slides, and gearing interconnecting the actuating spindle and the said screw threaded spindles, the latter spindles being inclined to the vertical, so that vertical movements of the guides cause the screen to approach and recede from the work piece in a manner correlated with the movements of the slides, and thereby enable the horizontal distance through which the silhouette or image is projected on to the screen by the optical means to be maintained constant.

JAMES WOLFE ALEXANDER.